(12) United States Patent
Tsirkin et al.

(10) Patent No.: US 9,164,789 B2
(45) Date of Patent: Oct. 20, 2015

(54) MULTIPLE QUEUE MANAGEMENT AND ADAPTIVE CPU MATCHING IN A VIRTUAL COMPUTING SYSTEM

(75) Inventors: Michael Tsirkin, Yokneam Yillit (IL); Ronen Hod, Shoham (IL)

(73) Assignee: Red Hat Israel, Ltd., Raanana (IL)

( * ) Notice: Subject to any disclaimer, the term of this patent is extended or adjusted under 35 U.S.C. 154(b) by 246 days.

(21) Appl. No.: 13/408,720

(22) Filed: Feb. 29, 2012

(65) Prior Publication Data

US 2013/0227562 A1 Aug. 29, 2013

(51) Int. Cl.
G06F 9/455 (2006.01)
G06F 9/46 (2006.01)
G06F 9/50 (2006.01)

(52) U.S. Cl.
CPC .......... *G06F 9/45558* (2013.01); *G06F 9/5088* (2013.01); *G06F 2209/5022* (2013.01)

(58) Field of Classification Search
None
See application file for complete search history.

(56) References Cited

U.S. PATENT DOCUMENTS

| | | | |
|---|---|---|---|
| 6,934,950 B1 * | 8/2005 | Tuel et al. | 718/102 |
| 7,257,811 B2 * | 8/2007 | Hunt et al. | 718/1 |
| 7,380,049 B2 * | 5/2008 | Rajagopal et al. | 718/1 |
| 7,784,053 B2 * | 8/2010 | Casey et al. | 718/104 |
| 7,784,060 B2 * | 8/2010 | Baumberger | 719/314 |
| 7,904,903 B2 * | 3/2011 | Grobman et al. | 718/1 |
| 2006/0069828 A1 * | 3/2006 | Goldsmith | 710/100 |

* cited by examiner

*Primary Examiner* — Lewis A Bullock, Jr.
*Assistant Examiner* — Jacob Dascomb
(74) *Attorney, Agent, or Firm* — Lowenstein Sandler LLP

(57) ABSTRACT

A method and system for managing multiple queues providing a communication path between a virtual machine and a hypervisor in a virtual machine system. The multiple queues are bundled together and identified on a polled list. When one of the queues on the polled list is used to communicate a request from the virtual machine to the hypervisor, a virtual machine exit is performed and a virtual machine exit is disabled for all of the queues on the polled list. The queues on the polled list are assigned to an initial host CPU to service requests from the virtual machine. If a particular queue on the polled list experiences a load that exceeds a load threshold, the particular queue is removed from the polled list and assigned to a different host CPU.

13 Claims, 3 Drawing Sheets

MULTIPLE QUEUE MANAGEMENT AND ADAPTIVE CPU MATCHING IN A VIRTUAL COMPUTING SYSTEM

TECHNICAL FIELD

Embodiments of the present invention relate to a computer system, and more specifically, to managing communication queues and optimizing host central processing units (CPUs) in a virtual machine system.

BACKGROUND

Virtualization allows multiplexing of an underlying host machine between different virtual machines. The host computer allocates a certain amount of its resources to each of the virtual machines, including host central processing units (CPUs). Each virtual machine is utilized by a guest to access the allocated resources to execute applications, including operating systems (referred to as guest operating systems). The software layer providing the virtualization is commonly referred to as a hypervisor (also known as a virtual machine monitor (VMM)) executed on a host operating system. The hypervisor emulates the underlying hardware of the host computer, making the use of the virtual machine transparent to the guest operating system and the user of the computer.

The virtual machines may communicate with the hypervisor via one or more queues. The queues may serve as channels for a guest running on a virtual machine to pass requests to the hypervisor for execution by a CPU of the host computer. Certain virtual machine systems may include a single queue for receiving multiple requests from a virtual machine. Such systems may be configured to batch or bundle the requests for communication to the hypervisor via the single queue. When the virtual machine places the requests on the queue, a virtual machine exit is performed which causes a transition of control from the virtual machine to the hypervisor (i.e., the virtual machine stops running in the virtualized mode). However, in many systems there is desire to handle a high load produced by multiple virtual CPUs (VCPUs) of the virtual machine by using multiple queues to communicate with multiple host CPUs for servicing the requests in parallel.

Although the use of multiple queues may be beneficial in handling high loads, the servicing of requests on each of the multiple queues may involve multiple VM exits (i.e., a VM exit for each of the multiple queues). The multiple exits performed in such systems typically significantly increase the overhead associated with communications relating to the exiting process.

DETAILED DESCRIPTION

Figure 1:
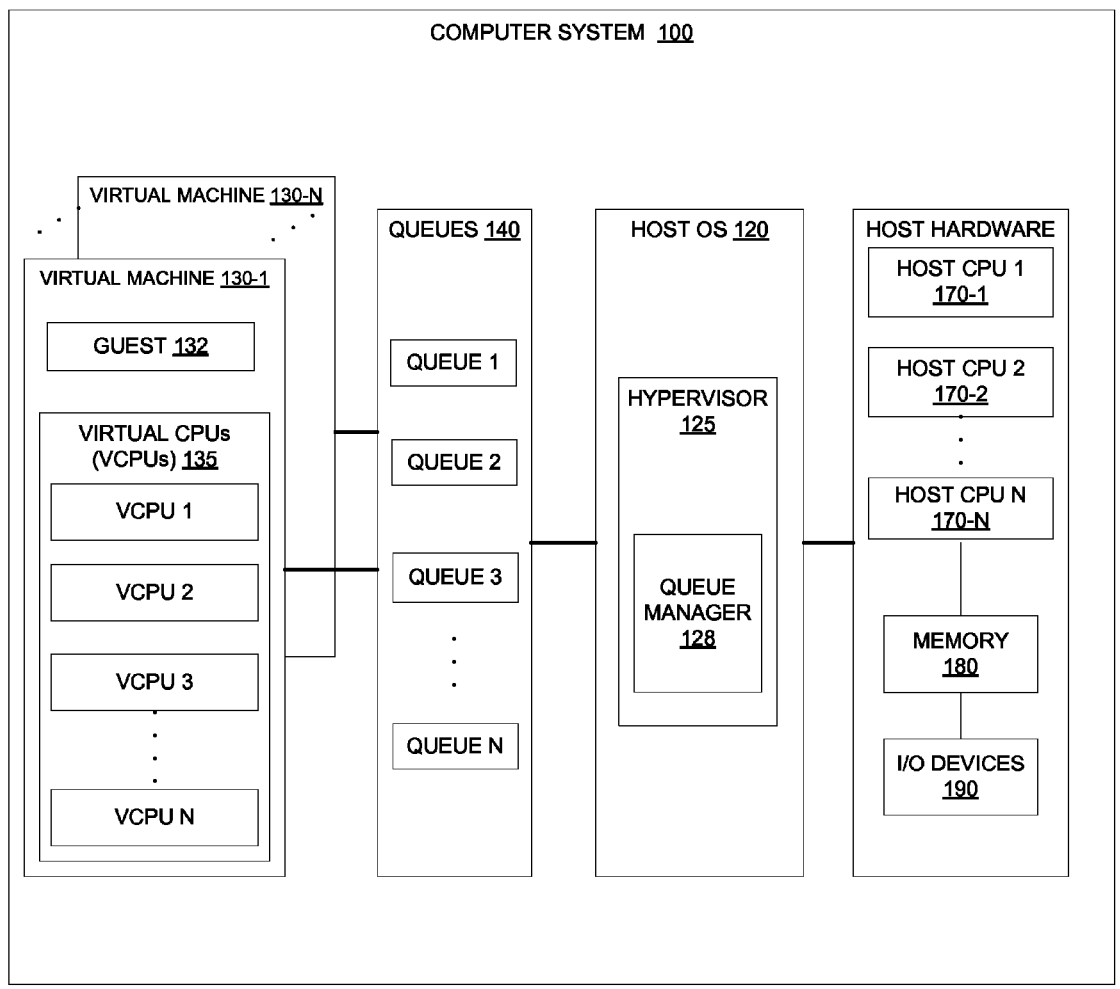
FIG. 1 is a block diagram of a virtual machine system including multiple queues, according to one embodiment of the present invention.

Methods and systems for managing multiple queues providing a path for communicating requests from one or more virtual machines to a hypervisor in a virtual machine system. The hypervisor of the virtual machine system manages the assignment of the queues to central processing units (CPUs) of a host hardware component of the virtual machine system.

The multiple queues are bundled together and a listing of the bundled queues is maintained (herein referred to as a "polled list"). When a request from a virtual machine is placed on one of the queues on the polled list, a virtual machine exit (VM exit) is performed. The execution of a virtual machine exit causes a transition of control from one or more virtual machines to the hypervisor (i.e., the one or more virtual machines stop running in the virtualized mode). The hypervisor then disables the virtual machine exit functionality for all of the queues on the polled list. Accordingly, in an embodiment, a single VM exit is performed for all of the queues on the polled list. It is noted that, according to an embodiment, multiple queues from different VMs may be bundled together into a single polled queue list.

In an embodiment, the multiple queues on the polled list are assigned to a host CPU (also referred to as an "initial host CPU") configured to handle requests from the virtual machine placed on the multiple queues. When servicing the virtual machine requests with the initial host CPU, a particular queue on the polled list may experience a load that exceeds a load threshold. If this happens, the particular queue is removed from the polled list and assigned to a different host CPU. As used herein, the "load" represents the amount of work performed by a queue or the amount of requests placed on a queue. In the event the load placed on the particular queue is at or below the load threshold, the particular queue is re-added to the polled list and re-assigned to the initial host CPU.

Accordingly, an efficient method and system is provided that optimizes the utilization of the host CPUs and the management of multiple queues providing communication paths between a virtual machine and a hypervisor in a virtual machine system. The bundling of multiple queues allows for the execution of a single virtual machine exit for the multiple queues and a corresponding savings in overhead utilization associated with the virtual machine exiting process. In addition, the method and system according to embodiments of the invention provide for adaptive and dynamic matching or assignment of queues to host CPU resources in a manner which advantageously provides for the parallel processing of virtual machine requests and queue load balancing.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1 is a block diagram that illustrates an exemplary computer system 100 in which embodiments of the present invention may operate. The computer system 100 hosts one or more virtual machines (VMs) 130 (e.g., VM 130-1, VM 130-N). Each virtual machine 130 runs a guest (e.g., guest 132) that uses a guest operating system to manage its resources. The virtual machine 130 may run the same or different guest operating systems, such as Microsoft Windows®, Linux®, Solaris®, Mac® OS, etc. The computer system 100 may be a server, a workstation, a personal computer (PC), a mobile phone, a palm-sized computing device, a personal digital assistant (PDA), etc.

Throughout the following description, the term "guest" refers to the software that runs or can run on the hypervisor that is installed on a disk, loaded into memory, or currently running. A guest may include one or more of the following: a firmware copy in memory, an operating system, additional installed software, a browser, applications running on the browser, etc. The term "virtual machine" (VM) refers to part of a hypervisor that is visible to the guest. A virtual machine may include one or more of the following: memory, virtual CPU, virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest, etc.

In one embodiment, the computer system 100 runs a hypervisor 125 to virtualize access to the underlying host hardware, making the use of the virtual machine 130 transparent to the guest 132 and the users of the computer system 100. In one embodiment, the hypervisor 125 may support the virtual machines 130. In one embodiment, the hypervisor 125 is part of a host operating system (OS) 120.

In one embodiment, the computer system 100 also includes hardware components (host hardware) including multiple host central processing units (CPUs) 170. The computer system 100 may also include memory 180, input/output (I/O) devices 190 and other hardware components. In one embodiment, the host CPUs 170 (e.g., host CPU 1 170-1, host CPU 2 170-2, host CPU N 170-N), host are configured to handle requests from the virtual machines 130. During operation, each guest 140 interacts with the host OS 120 via a virtual machine 130 and etc. communicates requests to the hypervisor 125 via the queues 140. Exemplary requests submitted by a guest 132 include a request to transmit a packet, a request to perform a disk I/O operation, a request to output an image to a display, a request to send data on a serial port, etc.

In an embodiment, the virtual machine 130 includes virtual CPUs 135 (VCPUs) configured to generate requests that are communicated to the hypervisor 125 via the queues 140. It is noted that any suitable methodology of assigning queues to the VCPUS may be utilized in accordance with embodiments of the present invention. In an embodiment, each VCPU 135 is assigned to a dedicated queue. For example, with reference to FIG. 1, VCPU 1 may be assigned to Queue 1, VCPU 2 may be assigned to Queue 2, etc. In another embodiment (not shown), each one of the VCPUs can submit request to any one of the queues, depending on the load executing on the respective VCPU.

In an embodiment, the hypervisor 125 includes a queue manager 128 configured to bundle multiple queues 140 (e.g., Queue 1, Queue 2, Queue 3 . . . Queue N) together and maintain a listing of the bundled queues (i.e., the polled list). In an embodiment, a list of queues may be maintained in a memory accessed by the queue manager 128 and all of the queues on the list are scanned on each polling request.

In another embodiment, a bit in a memory register shared by all of the queues is dedicated for each queue. The dedicated bit is set by the guest, atomically, when the queue becomes non-empty and is cleared, atomically, when the queue is empty. Advantageously, this exemplary bundling technique allows for quick polling since a single register check polls multiple queues.

According to one embodiment of the present invention, the queue manager 128 is configured to manage the bundled queues 140 and maintain the polled list including the bundled queues 140, as described in detail in connection with FIG. 2. In operation, when a request is received on one of the queues 140 (e.g., Queue 1) on the polled list, a VM exit is performed and the VM exit function for the queues 140 on the polled list is disabled by the queue manager 128. The queue manager 128 may then monitor the queues 140 to detect when they no longer have any requests. When the queues 140 are empty, the queue manager 128 may enable the VM exit functionality for the queues 140. In embodiments of the present invention, the VM exit may be performed by the guest 132, the hypervisor 125, or may be implicit in the communication protocol. Accordingly, a single VM exit is performed for the multiple queues resulting in a corresponding savings in overhead.

In an embodiment, the queue manager 128 is configured to adaptively assign or match the host CPUs 170 to the queues 140. In an embodiment, the multiple queues 140 on the polled list are assigned to an initial host CPU (e.g., Host CPU 1 in FIG. 1) configured to handle requests from the virtual machine 130 placed on the bundled queues 140. In an embodiment, the queue manager 128 monitors a load placed by a virtual machine 130 on each of the queues 140 on the polled list. For example, with reference to FIG. 1, the VCPUs 135 (e.g., VCPU 1, VCPU 2, VCPU 3 . . . VCPU N) may communicate requests using the bundle of queues 140 (e.g., Queue 1, Queue 2, Queue 3 . . . Queue N) identified on the polled list. The queue manager 128 of hypervisor 125 running on the initial host CPU 170 (e.g., Host CPU 1) is configured to poll the queues 140 on the polled list to identify requests from the virtual machine 130 and measure a load placed by the virtual machine 130 on each of the queues 140 on the polled list. In an embodiment, the load may be calculated by measuring the total size of the data transferred (per a designated unit of time).

In another embodiment, the load may be calculated by measuring the number of VM exits triggered (per a designated unit of time). In yet another embodiment, the load may be calculated by measuring the number of requests submitted (per a designated unit of time).

In another embodiment, the load may be calculated by measuring the amount of CPU time spent executing the queue commands. In another embodiment, if a queue is executed on dedicated host hardware (i.e., a non-bundled queue assigned to a dedicated host CPU), then the load may be determined by checking hardware performance counters or the hardware temperature. In another embodiment, the load may be calculated by taking a linear or non-linear combination of two or more of the load measurements described above. In the event the load placed on a particular queue 140 (e.g., Queue 2) is above a load threshold, the particular queue 140 is adaptively matched to a different and separate host CPU 170 (e.g., Host CPU 2) for further handling.

In an embodiment, the queue manager 128 continues to monitor the load placed on the queues 140. The queue manager 128 may use various mechanisms to determine the queue loads. For example, the queue manager 128 may determine the queue loads at a set interval (e.g., every 10 milliseconds or 20 milliseconds) or each time a request is received on the queues 140. In the event the load placed on the particular queue 140 (Queue 2) is at or below the load threshold, the particular queue is re-added to the polled list and re-assigned to the initial host CPU. In an embodiment, the queue manager 128 is connected to a memory (e.g., memory 180) configured to store the polled list and associated host CPU-queue matching tables. Advantageously, the adaptive and dynamic matching and assignment of the queues 140 to an appropriate host CPU 170 based on the load experienced by the queues 140 provides for parallel processing of virtual machine requests and efficient utilization of the host CPUs 170 in handling and balancing the request load.

Figure 2:
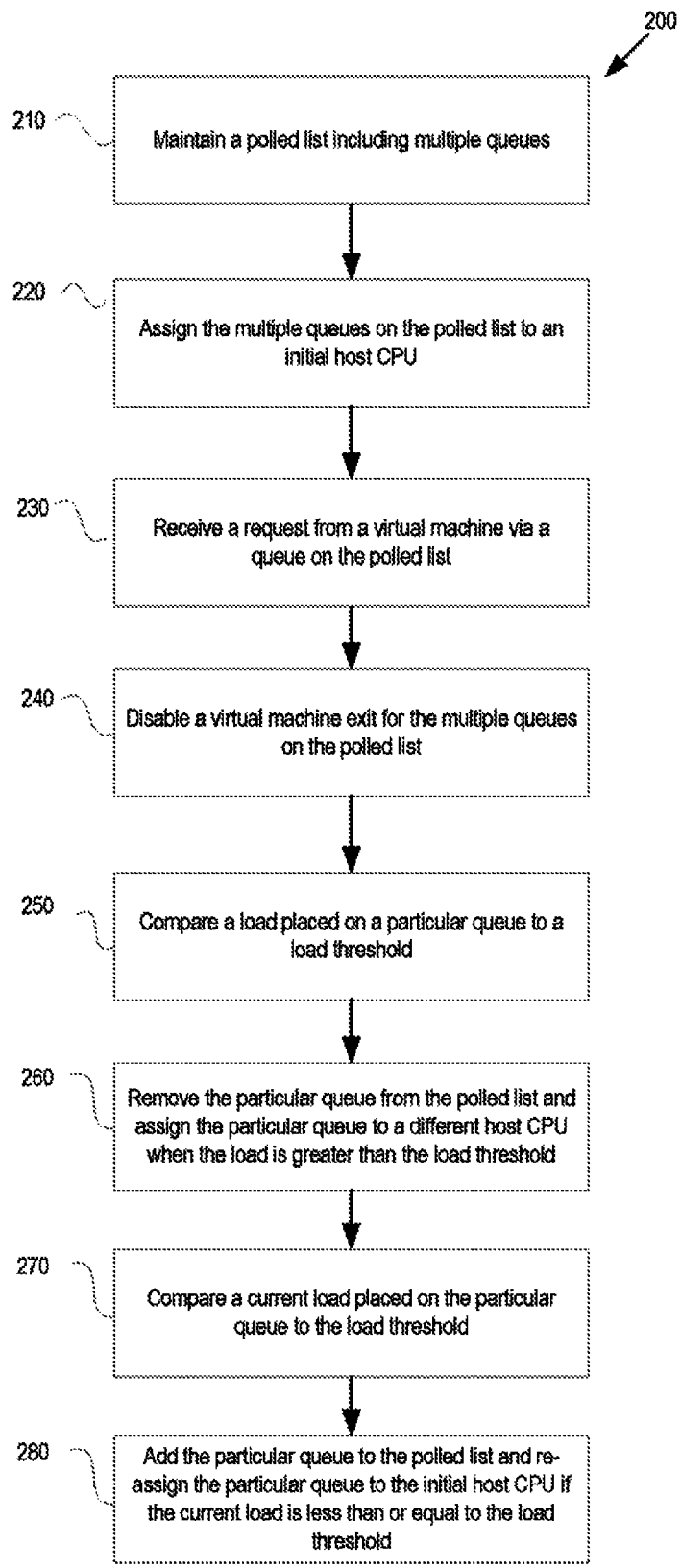
FIG. 2 is a flow diagram of one embodiment of a method for managing multiple queues and performing CPU matching in a virtual machine system, according to one embodiment of the present invention.

FIG. 2 is a flow diagram illustrating one embodiment of a method 200 for bundling multiple queues of a virtual machine computing system and adaptively matching the queues to a host CPU for the handling of requests from a virtual machine. The method 200 may be performed by a computer system 300 of FIG. 3 that may comprise hardware (e.g., circuitry, dedicated logic, programmable logic, microcode, etc.), software (e.g., instructions run on a processing device), or a combination thereof. In one embodiment, the method 200 is performed by the queue manager 128 of the hypervisor 125 of FIG. 1.

Referring to FIG. 2, in one embodiment, the method 200 begins when the multiple queues providing a communication path between a virtual machine and a hypervisor are bundled together and maintained in a polled list, in block 210. The bundled queues on the polled list are assigned to a host CPU configured to handle the requests received by the hypervisor from the virtual machine, in block 220. In an embodiment, the virtual machine includes multiple VCPUs which are each assigned to or associated with a dedicated queue on the polled list.

Upon receipt of a request from the virtual machine via a queue on the polled list in block 230, a VM exit is executed (transitioning control from the virtual machine to the hypervisor) and the hypervisor disables the VM exit function for the multiple queues on the polled list, in block 240. One having ordinary skill in the art will appreciate that the assignment of the multiple queues to an initial host CPU (in block 220) may be performed following receipt of a request from the virtual machine (in block 230) and/or the disabling of the VM exit for the bundled queues (in block 240).

The multiple queues on the polled list are polled by the initial host CPU to identify requests from the virtual machine and an associated load placed on the queues. In block 250, the load placed on one or more of the queues on the polled list is compared to a load threshold. If the load on a particular queue is greater than the load threshold, the hypervisor removes the particular queue from the polled list and assigns the particular queue to a different host CPU, in block 260. Advantageously, if the hypervisor determines that one of the multiple queues (i.e., the particular queue) has placed a load on the initial host CPU that exceeds the load threshold, the hypervisor is configured to split that particular queue out and assign it to a different/separate host CPU, resulting in parallel processing wherein the other queues on the polled queue list are handled by the initial host CPU while the high load queue is handled by the separate host CPU.

The hypervisor continues to monitor the load placed on the particular queue (assigned to the different host CPU) and compares that load to the load threshold, in block 270. In the event a current load placed on particular queue drops to or below the load threshold, the particular queue is re-added to the polled list and re-assigned to the initial host CPU, in block 280. In an embodiment, when all of the queues on the polled list are empty (i.e., there are no further requests), the hypervisor enables the VM exit function on all of the queues. In an embodiment, when a particular queue which is not on the polled list is empty, the hypervisor may enable the VM exit function on this queue.

Advantageously, the method 200 realizes the benefit of bundling multiple queues having a low load level (i.e., a load at or below the load threshold) on a single initial host CPU, thereby reducing the overhead associated with the VM exit communication protocol, since a single VM exit may be implemented for all of the queues on the polled list. Furthermore, if the load on a particular queue exceeds a load threshold, the method 200 may adaptively assign or match the queue to a different host CPU to allow for load balancing and optimized parallel processing.

Figure 3:
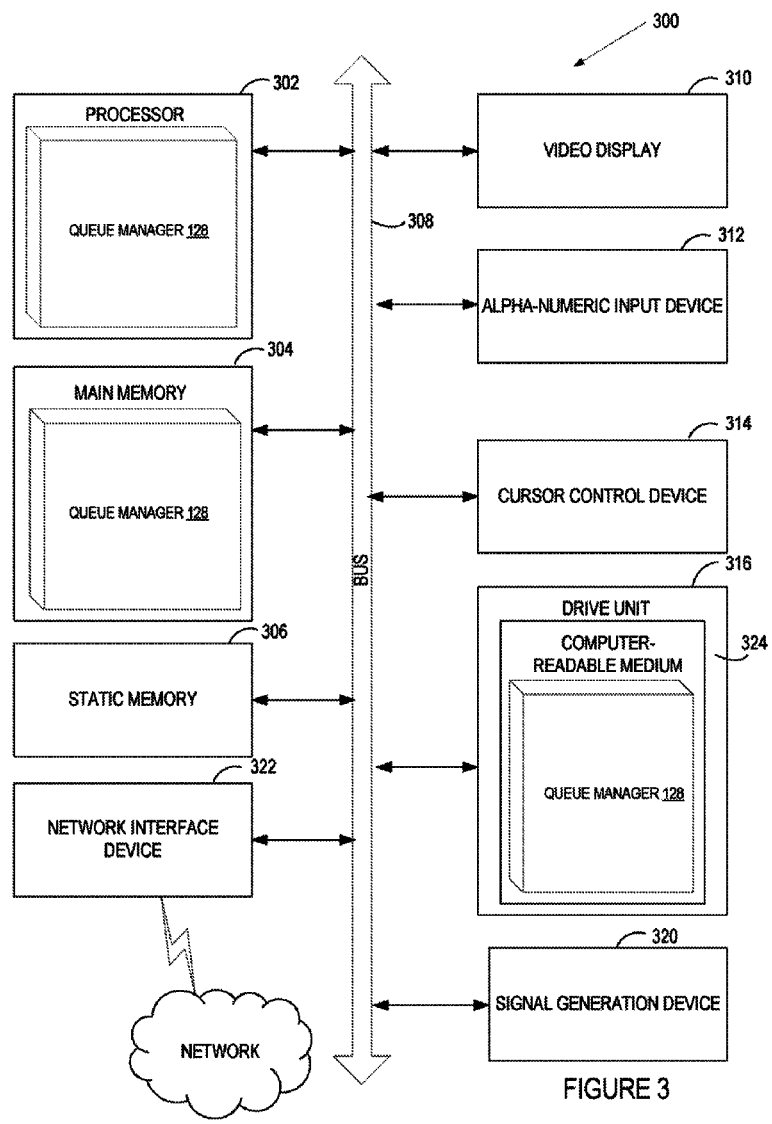
FIG. 3 illustrates a diagrammatic representation of an exemplary queue management system.

FIG. 3 illustrates a diagrammatic representation of a machine in the exemplary form of a computer system 300 within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processing device (processor) 302, a main memory 304 (e.g., read-only memory (ROM), flash memory, dynamic random access memory (DRAM) such as synchronous DRAM (SDRAM)), a static memory 306 (e.g., flash memory, static random access memory (SRAM)), and a data storage device 316, which communicate with each other via a bus 308.

Processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The queue manager 128 in FIG. 1 may comprise processor 302 configured to perform the operations and steps discussed herein.

The computer system 300 may further include a network interface device 322. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

A drive unit 316 may include a computer-readable medium 324 on which is stored one or more sets of instructions (e.g., instructions of the queue manager 128) embodying any one or more of the methodologies or functions described herein. The instructions of the queue manager 128 may also reside, completely or at least partially, within the main memory 304 and/or within the processor 302 during execution thereof by the computer system 300, the main memory 304 and the processor 302 also constituting computer-readable media. The instructions of the queue manager 128 may further be transmitted or received over a network via the network interface device 322.

While the computer-readable storage medium 324 is shown in an exemplary embodiment to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "maintaining", "assigning", "comparing", "removing", "adding", "re-assigning", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
maintaining, by a hypervisor executed by a processing device, a polled list comprising a plurality of queues, the plurality of queues being bundled together, the bundled plurality of queues on the polled list to provide a communication path between a first virtual machine and the hypervisor, the communication path enabling transmission of a plurality of requests from the first virtual machine to the hypervisor, wherein the bundled plurality of queues on the polled list is assigned to an initial host central processing unit (CPU) and one or more virtual CPUs (VCPUs);
receiving, by the hypervisor, a request from the first virtual machine via a first queue of the bundled plurality of queues on the polled list;
in response to the request, scanning, by the hypervisor, the bundled plurality of queues, performing a virtual machine exit and disabling of virtual machine exit functionality for each of the bundled plurality of queues on the polled list; and
after determining, by the hypervisor, each queue in the bundled plurality of queues is empty, enabling the virtual machine exit functionality for each of the bundled plurality of queues on the polled list.

2. The method of claim 1 further comprising:
comparing a load placed on a particular queue of the bundled plurality of queues on the polled list to a load threshold; and
removing, by the hypervisor, the particular queue from the polled list and assigning the particular queue to a different host CPU when the load is greater than the load threshold.

3. The method of claim 1 further comprising:
comparing a load on a particular queue to a load threshold; and
assigning the particular queue to an initial host CPU when the load is less than or equal to the load threshold.

4. The method of claim 3 further comprising adding, by the hypervisor, the particular queue to the polled queue list.

5. The method of claim 1, wherein disabling of virtual machine exit functionality for each of the bundled plurality of queues on the polled list is performed by one of the virtual machine, the initial host CPU, or the hypervisor.

6. A non-transitory computer readable storage medium comprising including instructions that, when executed by a processing device, cause the processing device to:
maintain, by a hypervisor executed by a processing device, a polled list comprising a plurality of queues, the plurality of queues being bundled together, the bundled plurality of queues on the polled list to provide a communication path between a first virtual machine and the hypervisor, the communication path enabling transmission of a plurality of requests from the first virtual machine to the hypervisor, wherein the bundled plurality of queues on the polled list is assigned to an initial host central processing unit (CPU) and one or more virtual CPUs (VCPUs);

receive, by the hypervisor, a request from the first virtual machine via a first queue of the bundled plurality of queues on the polled list;

in response to the request, scan, by the hypervisor, the bundled plurality of queues, perform a virtual machine exit and disabling of virtual machine exit functionality for each of the bundled plurality of queues on the polled list; and after determining, by the hypervisor, each queue in the bundled plurality of queues is empty, enable the virtual machine exit functionality for each of the bundled plurality of queues on the polled list.

7. The non-transitory computer readable storage medium of claim 6, the processing device to:

compare a load placed on a particular queue of the bundled plurality of queues on the polled list to a load threshold; and remove the particular queue from the polled list and assign the particular queue to a different host CPU when the load is greater than the load threshold.

8. The non-transitory computer readable storage medium of claim 6, the processing device to:

compare a load on a particular queue to a load threshold; and assign the particular queue to an initial host CPU when the load is less than or equal to the load threshold.

9. The non-transitory computer readable storage medium of claim 8, the processing device to add the particular queue to the polled queue list.

10. A computer system comprising:

a memory comprising instructions;

a processing device operatively coupled to the memory, the processing device to execute the instructions to:

maintain, by a hypervisor executed by a processing device, a polled list comprising a plurality of queues, the plurality of queues being bundled together, the bundled plurality of queues on the polled list to provide a communication path between a first virtual machine and the hypervisor, the communication path enabling transmission of a plurality of requests from the first virtual machine to the hypervisor, wherein the bundled plurality of queues on the polled list is assigned to an initial host central processing unit (CPU) and one or more virtual CPUs (VCPUs);

receive, by the hypervisor, a request from the first virtual machine via a first queue of the bundled plurality of queues on the polled list;

in response to the request, scan, by the hypervisor, the bundled plurality of queues, perform a virtual machine exit and disabling of virtual machine exit functionality for each of the bundled plurality of queues on the polled list; and after determining, by the hypervisor, each queue in the bundled plurality of queues is empty, enable the virtual machine exit functionality for each of the bundled plurality of queues on the polled list.

11. The computer system of claim 10, the processing device to:

compare a load placed on a particular queue of the bundled plurality of queues on the polled list to a load threshold, and remove the particular queue from the polled list and assign the particular queue to a different host CPU of a plurality of host CPUs when the load is greater than the load threshold.

12. The computer system of claim 10, the processing device to:

compare a load on a particular queue to a load threshold, and assign the particular queue to the initial host CPU when the load is less than or equal to the load threshold.

13. The computer system of claim 12, the processing device to add the particular queue to the polled queue list.

* * * * *